United States Patent Office 3,757,008
Patented Sept. 4, 1973

3,757,008
1 - (CARBOXYL-HETEROALKYL) - 1,4-BENZODI-
AZEPINE DERIVATIVES AND PROCESSES FOR
PREPARING SAME
Joseph Hellerbach and Roland Jaunin, Basel, Switzerland,
assignors to Hoffmann-La Roche Inc., Nutley, N.J.
No Drawing. Filed Sept. 30, 1971, Ser. No. 185,389
Claims priority, application Switzerland, Oct. 7, 1970,
14,905/70
Int. Cl. C07d 53/06
U.S. Cl. 260—239.3 D          15 Claims

ABSTRACT OF THE DISCLOSURE

Novel 1,4-benzodiazepine derivatives bearing a carboxyl-heteroalkyl group in the 1-position and processes for preparing said compounds are disclosed. These 1-(carboxyl-heteroalkyl)-1,4-benzodiazepine derivatives are useful as muscle-relaxant, anti-convulsant and sedative agents.

DETAILED DESCRIPTION OF THE INVENTION

The present invention relates to 1-substituted 1,4-benzodiazepines. More particularly, this invention concerns 1,4-benzodiazepines bearing a carboxyl-heteroalkyl group in the 1-position. The invention further comprehends processes for making these novel benzodiazepines and novel intermediates employed in these processes.

More specially, the compounds of the present invention are selected from the group consisting of compounds of the formula

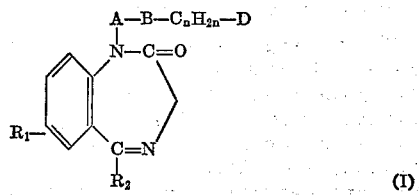

compounds of the formula

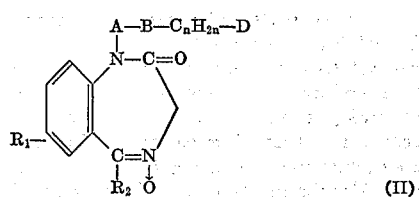

wherein $R_1$ signifies halogen, nitro, trifluoromethyl, alkyl having from 2 to 5 carbon atoms, or lower alkanoyl; $R_2$ signifies pyridyl, phenyl, monohalophenyl or di-halophenyl; A signifies ethylene, propylene or isopropylene; B signifies —O—, —S—, or the group —$NR_3$— wherein $R_3$ is hydrogen or lower alkyl; D signifies lower alkoxycarbonyl, cyano, carbamoyl, mono-lower alkyl-carbamoyl or di-lower alkyl-carbamoyl; $n$ is the integer 1 or 2 and the pharmaceutically acceptable acid addition salts thereof.

As used herein, the term "lower alkyl" either alone or in combination, refers to straight or branched chain hydrocarbon group containing from 1 to 7, preferably from 1–4 carbon atoms, such as, for example, methyl, ethyl, propyl, isopropyl, butyl, isobutyl, t-butyl and the like. The term "lower alkanoyl" denotes an acyl group derived from an aliphatic carboxylic acid containing at most 5 carbon atoms, such as formyl, acetyl, propionyl and the like. The term "lower alkoxy" designates straight or branched chain saturated hydrocarbonoxy groups containing from 1 to 7, preferably from 1 to 4 carbon atoms, such as methoxy, ethoxy, propoxy and the like. The term "halogen" refers to all four forms thereof, i.e., bromine, chlorine, fluorine and iodine. The term "isopropylene" includes both isomeric forms, i.e., both

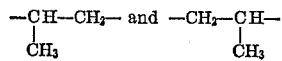

A preferred class of compounds falling within the scope of Formulae I and II above are those wherein B signifies an oxygen atom, i.e., compounds of the formula

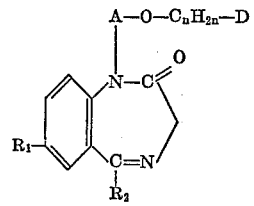

and of the formula

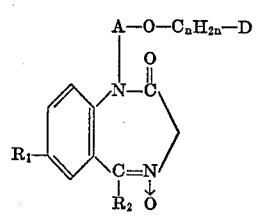

wherein $R_1$, $R_2$, A, D and $n$ are as described above.

In another preferred aspect, B in the compounds of Formulae I and II signifies —$NR_3$— and wherein $R_3$ is lower alkyl, methyl is preferred.

Another preferred class of compounds falling within the scope of the Formulae I and II are those wherein D signifies cyano or carbamoyl, i.e., compounds of the formula

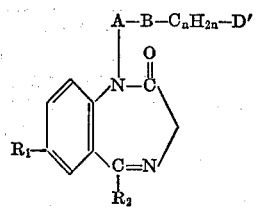

and of the formula

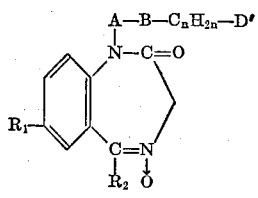

wherein D' signifies cyano or carbamoyl and $R_1$, $R_2$, A, B and $n$ are as described above.

In other preferred aspects, when the $R_1$ substituent is an alkyl group, the ethyl group is preferred; when the $R_1$ substituent is a lower alkanoyl group, the acetyl group is preferred; when the $R_1$ substituent is halogen and the $R_2$ substituent is phenyl or a substituted phenyl group, chlorine or iodine are preferred; whereas when $R_1$ is halogen and $R_2$ is pyridyl, bromine is preferred. $R_2$ preferably represents phenyl, ortho-halophenyl, most preferably ortho-fluorophenyl or ortho-chlorophenyl, 2,6-dihalophenyl, especially 2,6-difluorophenyl or 2-pyridyl.

Most preferred of the compounds of Formula I are:

1-[2-(carbamoylmethoxy)-ethyl]-7-chloro-5-(2-fluorophenyl)-1,3-dihydro-2H-1,4-benzodiazepin-2-one;
1-{2-[(carbamoylmethyl)methylamino]ethyl}-7-chloro-5-(o-fluorophenyl)-1,3-dihydro-2H-1,4-benzodiazepin-2-one; and
1-[2-(carbamoylmethoxy)ethyl]-7-chloro-5-(o-chlorophenyl)-1,3-dihydro-2H-1,4-benzodiazepin-2-one.

The compounds of Formulas I and II above may be prepared following a variety of synthetic routes.

(A) Following one such process aspect, the compounds of Formulas I and II can be prepared by reacting a compound of the general formula

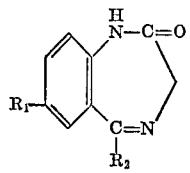

(III)

wherein $R_1$ and $R_2$ are as described above, or the 4-oxide thereof with a compound of the general formula

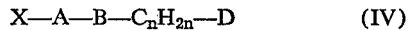

$$X\text{---}A\text{---}B\text{---}C_nH_{2n}\text{---}D \qquad (IV)$$

wherein A, B, D and $n$ are as described above, provided that when B signifies —$NR_3$—, $R_3$ is alkyl or a suitable protecting group; and X is a suitable leaving group, and, where $R_3$ is a protecting group, removing said protecting group from the so-formed product.

This process aspect is preferred for the preparation of compounds of Formula II.

The alkylation of the starting materials of Formula III or the 4-oxides thereof is expediently carried out by first converting said compound to the 1-alkali metal salt thereof, preferably the sodium salt. Conversion of the compound of Formula III or its 4-oxide to its 1-alkali metal salt is effected, for example, by reacting said compound with an alkali metal base. Suitable bases for this purpose include alkali metal alkoxides, such as sodium methoxide; alkali metal hydrides, such as sodium hydride; an alkali amide such as sodium amide or an alkali hydroxide such as sodium hydroxide.

The reaction of a compound of Formula III or a 4-oxide thereof with a compound of Formula IV is expediently carried out in the presence of an inert organic solvent. Suitable inert organic solvents are, for example, dimethylformamide, dimethylsulfoxide, ethyl acetate and alkanols such as isopropanol. The reaction temperature is variable within rather wide limits. As a rule, it will lie between room temperature and the boiling temperature of the reaction mixture. In general, however, temperatures above 120° C. should be avoided. Preferred reaction temperatures lie between 60° C. and 80° C. The reaction can be effected at atmospheric pressure or with the application of pressure.

The leaving group designated as X in the compounds of Formula IV can be any leaving group suitable for the purposes of the present invention. Representative leaving groups for this purpose include a halogen atom, especially chlorine or bromine, an arylsulfonyloxy group, such as tosyloxy, or an alkylsulfonyloxy group, such as mesyloxy. Quaternary ammonium groups such as the trimethyl ammonium group can also serve as effective leaving groups.

When it is desired to manufacture a compound of Formulas I or II in which B represents the —NH— group, the amino group in the starting material of Formula IV must be protected by a protecting group which is cleaved off after the reaction with a compound of Formula III or a 4-oxide thereof. Especially suitable protecting groups are the benzyloxycarbonyl group and the benzyl group; it being expedient to replace a benzyl group by a benzyloxycarbonyl group before carrying out the cleavage. The cleavage of such a group can be carried out in a known manner by solvolysis or hydrogenolysis.

The starting materials of Formulas III and IV used in this process aspect are known or can be prepared in analogy to the preparation of known compounds.

(B) In a further process aspect of the present invention, compounds of Formulas I and II are prepared by reacting a compound of the general formula

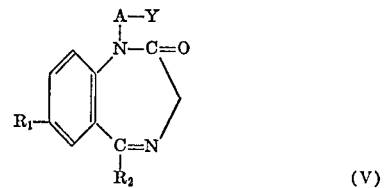

(V)

wherein $R_1$, $R_2$ and A are as described above and Y signifies hydroxy, mercapto, amino, lower alkylamino, halogen, or a suitable leaving group or a 4-oxide thereof with a compound of the formula

$$Z\text{---}B\text{---}C_nH_{2n}\text{---}D \qquad (VI)$$

wherein B, D and $n$ are as described above and Z signifies hydroxy, mercapto, amino, lower alkylamino, halogen, or a suitable leaving group; with the proviso that either Y or Z signifies hydroxy, mercapto, amino or lower alkylamino and the other group signifies halogen or a suitable leaving group.

The leaving group that can be present in either the compound of Formula V or the compound of Formula VI is any group suitable for the present purposes. Representative leaving groups include a halogen atom, preferably chlorine or bromine, an arylsulfonyloxy group, such as tosyloxy, or an alkylsulfonyloxy group, such as mesyloxy. Quaternary ammonium groups can also serve as effective leaving groups.

Since the reaction between the compounds of Formulas V and VI above results in the release of acid, it is expedient to carry out the reaction in the presence of an acid-binding agent. Suitable acid-binding agents are, for example, tertiary organic bases such as trialkylamines (especially triethylamine or ethyldiisopropylamine) and alkali carbonates (especially potassium hydrogen carbonate). For the manufacture of ethers and thioethers of Formula I or Formula II, i.e., those compounds wherein B represents —O— or —S—, stronger bases such as alkali hydroxides (e.g., sodium hydroxide) and alkali hydrides (e.g., sodium hydride) can also be employed.

The reaction of a compound of Formula V or a 4-oxide thereof with a compound of Formula VI can be carried out in the presence of an inert organic solvent. Suitable inert organic solvents are, for example, hydrocarbons such as benzene and toluene, ethers such as dioxane, dimethylsulfoxide and dimethylformamide. It is also possible to use simple ketones such as methyl ethyl ketone as the solvent. However, such solvents should be avoided when one reaction partner is present as the free amine. The reaction temperature can vary within a wide range. Generally, however, the reaction is carried out at a temperature between room temperature and about 150° C., depending upon the solvent chosen. The use of pressure is possible, but it is preferable to effect the reaction at atmospheric pressure.

The starting materials of Formulas V and VI employed in this process aspect are known compounds or can be prepared in analogy to the preparation of known compounds.

(C) In still another process aspect of the present invention, the compounds of Formula I above can be prepared by cyclizing a compound of the general formula

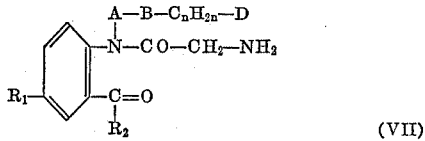

(VII)

wherein $R_1$, $R_2$, A, B, D and $n$ are as described above.

The cyclization of a compound of Formula VII is effected almost spontaneously. It can, if desired, be accelerated by prolonged standing and/or by the application of heat. It can be carried out in a neutral, alkaline or acidic medium with an alkaline medium being preferred. It is expedient to carry out the cyclization in the presence of an inert organic solvent, for example, a hydrocarbon such as benzene or toluene, a chlorinated hydrocarbon such as chloroform or methylene chloride, an ether such as dioxane, glacial acetic acid or dimethylformamide. As mentioned above, temperature is not a critical parameter in the carrying out of the cyclization. Temperatures in the range between room temperature and about 150° C. (regard being paid to the solvent employed) are appropriate. The cyclization can be carried out under pressure, but this is, however, not essential.

The compounds of Formula VII above can be used in pure form or most advantageously, need not be isolated from the reaction mixture in which they are prepared so that cyclization occurs in situ.

The starting materials of Formula VII employed in this process aspect are novel and as such form a part of the present invention. These compounds can be prepared from the corresponding 2-amino-benzophenones or 2-aminophenyl pyridyl ketones. These benzophenones or ketones can either be reacted in a first step with a halide of Formula IV and the reaction product obtained reacted in a second step with a glycine derivative protected at the amino group (e.g., phthalylglycine chloride, phthalylglycine etheyl ester or carbobenzoxyglycyl chloride) or these two steps can be carried out in reversed sequence. In each case there is obtained a corresponding 2-aminobenzophenone or 2-aminophenyl pyridyl ketone which carries, on the 2-amino group, on the one hand, the grouping $—A—B—C_n—H_{2n}—D$ and, on the other hand, a glycyl group protected at the amino group. In order to obtain a compound of Formula VII, the protecting group on the glycyl group must be cleaved off. A phthalyl group can be removed in a conventional manner by hydrazinolysis and a carbobenzoxy group can be removed in a conventional manner either hydrogenolytically or by treatment with hydrobromic acid in glacial acetic acid.

(D) In another process aspect of this invention, compounds of Formula I above can be prepared by the de-oxygenation of the corresponding compound of Formula II.

The de-oxygenation of a compound of Formula II above can be carried out, for example, by means of a phosphorus trihalide, especially phosphorus trichloride. This de-oxygenation is expediently carried out in the presence of an inert organic solvent; for example, a hydrocarbon such as benzene or a chlorinated hydrocarbon such as chloroform or methylene chloride. The temperature advantageously lies at between room temperature and about 80° C. to 100° C.

The de-oxygenation can also be carried out by hydrogenation in the presence of Raney nickel. This reaction is also expediently effected in the presence of an inert organic solvent; for example, an alkanol such as ethanol, an ether such as dioxane, or ethyl acetate. This reaction is advantageously carried out at a temperature in the vicinity of room temperature.

(E) In a further process aspect, the compounds of Formulas I and II above wherein D signifies carbamoyl can be prepared by the hydrolysis of the corresponding compounds of Formulas I or II wherein D signifies a cyano group. Thus, the nitrile of the formula

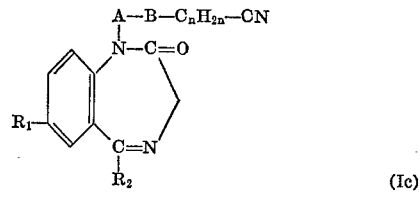

(Ic)

or the 4-oxide thereof of the formula

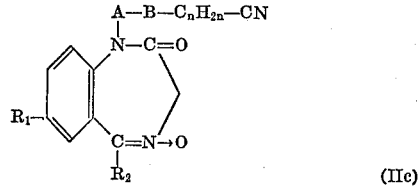

(IIc)

wherein $R_1$, $R_2$, A, B, and $n$ are as described above can be hydrolyzed to the corresponding amide of the formula

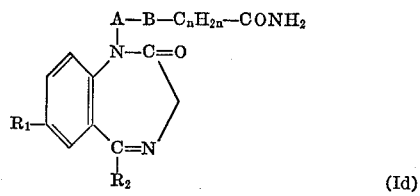

(Id)

or the 4-oxide thereof of the formula

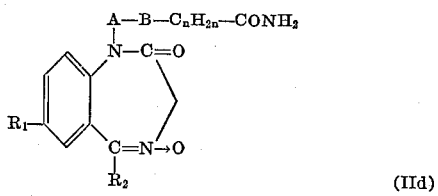

(IId)

wherein $R_1$, $R_2$, A, B, and $n$ are as described above.

The hydrolysis of the nitrile of Formulas Ic or IIc to the corresponding amide of Formulas Id or IId is carried out following conventional techniques, as for example, by treatment with a strong acid, especially hydrobromic acid, in the presence of an inert organic solvent, preferably glacial acetic acid. This reaction is expediently carried out at room temperature.

(F) In another process aspect, the compounds of Formulas Ic and IIc can be prepared by dehydrating the corresponding compounds of Formulas Id or IId. This dehydration can be achieved in a conventional manner by means of phosphorus pentoxide or phosphorus oxychloride. Suitable solvents for this dehydration are, for example, chlorinated aliphatic hydrocarbons such as chloroform, methylene chloride and carbon tetrachloride. The transformation of the amide group into a cyano group can also be carried out by treatment with arylsulfonyl chlorides such as benzenesulfonyl chloride or toluenesulfonyl chloride in the presence of a pyridine base.

(G) Following another process aspect, the compounds of Formulas I or II wherein D signifies carbamoyl, mono-lower alkyl-carbamoyl or di-lower alkyl-carbamoyl can be prepared by transforming the corresponding compound of Formulas I or II wherein D signifies lower alkoxy carbonyl into the desired amides.

The ammonolysis or aminolysis of the ester used as the starting material of this process aspect can be carried out using conventional techniques by treatment of the ester with ammonia or a primary or secondary lower alkylamine. In this case it is expedient to carry out the treatment in an inert organic solvent; for example, an alkanol such as ethanol, a hydrocarbon such as benzene or a chlorinated hydrocarbon such as chloroform. Aqueous solutions of ammonia or of the amine can also be employed if desired. The temperature at which the treatment is carried out generally lies between room temperature and about 150° C. and is dependent on the solvent used.

(H) The compounds of Formula I or II in which D signifies carbamoyl, mono-lower alkyl-carbamoyl or di-lower alkyl-carbamoyl can also be prepared by saponifying the corresponding ester of Formula I or II, i.e., the compound wherein D signifies lower alkoxy-carbonyl, to the corresponding acid and transforming said acid to the desired amide.

The saponification of an ester to the acid can be carried out using conventional methods, for example, both by basic and by acidic saponification. Suitable acidic agents are, for example, dilute hydrochloric acid or dilute sulfuric acid. In this case, the temperature advantageously lies at about 60° C. to 100° C. The basic saponification is expediently carried out using aqueous alkali (e.g., caustic soda) at a temperature between room temperature and about 60° C. and yields the corresponding salt.

The transformation of an acid into the desired amide can be carried out directly following known techniques by reaction of the free acid with ammonia or a primary or secondary lower alkylamine. It is advantageous to carry out this transformation in two stages by first converting the acid into an acid halide, especially the acid chloride, or into a reactive acid anhydride, whereupon this acid chloride or acid anhydride is subsequently reacted or is reacted in situ with ammonia or the lower alkylamine. The conversion into an acid chloride can be effected for example, by treatment with phosphorus pentachloride or thionyl chloride. The reaction is expediently carried out in the absence of a solvent or in the presence of an inert organic solvent such as chlorinated hydrocarbon (e.g., methylene chloride or chloroform) at a temperature in the range of from about −20° C. to about 30° C., preferably at room temperature. For the preparation of the acid anhydride, the acid is expediently reacted with a chlorocarbonic acid alkyl ester (e.g., the ethyl ester). In this case, the reaction is advantageously carried out in the presence of a tertiary organic base (e.g., a trialkylamine such as triethylamine). The reaction temperature expediently lies between −5° C. and room temperature. An inert organic solvent such as chloroform, toluene, tetrahydrofuran or dimethylformamide can serve as the reaction medium.

The reaction of the acid chloride or acid anhydride formed with ammonia or a primary or secondary lower alkylamine is advantageously carried out at a temperature between −5° C. and room temperature and in a solvent such as water, chloroform, toluene, tetrahydrofuran, dimethylformamide and mixtures thereof.

(I) In still another process aspect of this invention, the compounds of Formula I above can be prepared by oxidizing or dehydrogenating a compound of the general formula

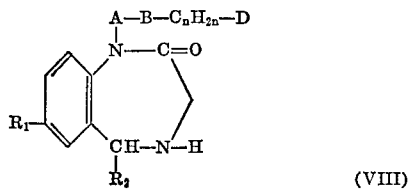

(VIII)

wherein $R_1$, $R_2$, A, B, D and $n$ are as described above.

The oxidation of the compounds of Formula VIII above to introduce the 4,5-double bond can be accomplished utilizing conventional techniques, as for example, by treatment with bromine, chlorine, or azodicarboxylic acid esters such as ethyl ester. The reaction is expediently carried out using an inert organic solvent such as a halogenated hydrocarbon (e.g., carbon tetrachloride, methylene chloride or chloroform), an ether (e.g., dioxane or tetrahydrofuran) and the like. The reaction is expediently carried out at a temperature between about −30° C. and 100° C.

The starting materials of Formula VIII used for the process aspect are novel and as such form a part of the present invention. They can be prepared from the corresponding compounds which are unsubstituted in the 1-position in accordance with the procedure described under process aspect (A) above. In this case, it is expedient to protect the nitrogen function in the 4-position of the 1-unsubstituted compound, advantageously with a carbobenzoxy group. After the $N_1$-substitution, the protecting group is removed using known techniques as by solvolysis or hydrogenolysis.

The compounds of Formulas I and II above which are basic in nature form acid addition salts with inorganic or organic acids such as hydrochloric acid, phosphoric acid, hydrobromic acid, citric acid, sulfuric acid, acetic acid, formic acid, succinic acid, maleic acid, p-toluenesulfonic acid and the like.

The compounds of Formulas I and II above and the pharmaceutically acceptable salts thereof are useful as anti-convulsant, muscle relaxant, sedative and anxiolytic agents. The anti-convulsant activity is demonstrated when mice to which said compounds have been administered are subjected to the pentamethylenetetrazole test. For example, when testing for anti-convulsant activity in the pentetrazole test according to the method of Orloff (Proc. Soc. Exptl. Biol. Med. 70 254–257, 1949), 1-[2-(carbamoylmethoxy)-ethyl]-7-chloro - 5 - (2-fluorophenyl)-1,3-dihydro-2H-1,4-benzodiazepin-2-one (Compound A), which displays an $LD_{50}$ of greater than 1250 mg./kg. (p.o.), exhibits an APR 2.0 of 0.76 mg./kg. (p.o.) (by APR 2.0 there is meant that dosage in mg./kg. of an anti-convulsant which brings about double the pentetrazole consumption in comparison to the untreated control group). In contrast thereto, phenobarbital, a well-known anti-convulsant, exhibits an APR 2.0 of 30 mg./kg. The muscle relaxant activity can be demonstrated in the rotating rod test. For example, in this test, Compound A exhibits an $HD_{50}$ of 0.2 mg./kg. (p.o.).

The compounds of Formulas I and II above and the pharmaceutically acceptable salts thereof accordingly can be used as medicaments; for example, in the form of pharmaceutical preparations which contain them in association with a compatible pharmaceutical carrier. This carrier can be an organic or inorganic inert carrier material which is suitable for enteral or parenteral administration; for example, water, gelatin, lactose, starches, magnesium stearate, talc, vegetable oils, gums, polyalkylene glycols, petroleum jelly, etc. The pharmaceutical preparations can be made up in solid form (e.g., as tablets, dragees, suppositories or capsules) or in liquid form (e.g., as solutions, suspensions or emulsions). They may be sterilized and/or may contain adjuvants such as preserving, stabilizing, wetting or emulsifying agents, salts for varying the osmotic pressure or buffers. They can also contain other therapeutically valuable substances. The dosage follows individual requirements, but a dosage of 0.01 mg./kg. to 1 mg./kg./day is preferred.

The following examples further illustrate the present invention. Unless indicated otherwise, all temperatures are given in degrees centigrade.

Example 1

A solution of 11.3 g. (0.037 mol) of 7-chloro-5-(o-chlorophenyl) - 1,3 - dihydro - 2H-1,4-benzodiazepin-2-one in 100 ml. of dimethylformamide is treated at 0°–5° with a solution of 2.06 g. (0.090 mol) of sodium in 20 ml. of methanol. The mixture is subsequently stirred at room temperature for 15 minutes, 8.4 g. (0.045 mol) of 2 - (N-methyl-2-chloroethylamino)acetamide hydrochloride are added and the mixture is heated at 60° for 6 hours. After concentration under reduced pressure, the residue is partitioned between water and methylene chloride, the organic phase washed with a saturated aqueous solution of sodium chloride, dried over sodium sulfate and evaporated. The remaining oil crystallizes on trituration with ether. The crude product is recrystallized once from ethanol and once from methylene chloride/ether. There is obtained 1 - {2 - [(carbamoylmethyl)methylamino]ethyl} - 7 - chloro - 5 - (o-chlorophenyl)-1,3-dihydro-2H-1,4-benzodiazepin-2-one of melting point 152°–154°. The different mother liquors are combined, concentrated to dryness, taken up in methylene chloride and chromatographed on 200 g. of silica gel. The column is initially eluted with methylene chloride/ethyl acetate (1:1), whereby starting material is recovered. The column is subsequently washed out with methanol. Concentration of the eluate and recrystallization of the residue (once from ethanol and once from methylene chloride/ether) gives an additional amount of the desired product of melting point 152°–154°.

Example 2

In accordance with the procedure described in Example 1, from 10.8 g. of 7-chloro-5-(o-fluorophenyl)-1,3-dihydro-2H-1,4-benzodiazepin-2-one and 8.4 g. of 2-(N-methyl - 2 - chloroethylamino)acetamide hydrochloride there is obtained a solid product which, after recrystallization from acetonitrile, yields 1-{2-[(carbamoylmethyl)methylamino]ethyl} - 7 - chloro-5-(o-fluorophenyl)-1,3-dihydro-2H-1,4-benzodiazepin-2-one of melting point 130°–132°. Chromatography of the different mother liquors and recrystallization of the uniform fractions yields, besides starting material, an additional amount of the desired product of melting point 130°–132°.

Example 3

In accordance with the procedure described in Example 1, from 10 g. of 7-chloro-1,3-dihydro-5-phenyl-2H-1,4-benzodiazepin-2-one and 8.4 g. of 2-(N-methyl-2-chloroethylamino)acetamide hydrochloride there is obtained a solid product which, after recrystallization from acetone, yields 7.8 g. of 1-{2-[(carbamoylmethyl)methylamino]ethyl} - 7 - chloro - 1,3-dihydro-5-phenyl-2H-1,4-benzodiazepin-2-one of melting point 146°–148°. Chromatography of the different mother liquors and recrystallization of the uniform fractions yields, besides starting material, an additional amount of the desired product of melting point 146°–148°.

Example 4

In accordance with the procedure described in Example 1, from 10.4 g. of 1,3-dihydro-7-nitro-5-phenyl-2H-1,4-benzodiazepin-2-one and 8.4 g. of 2-(N-methyl-2-chloroethylamino)acetamide hydrochloride there is obtained a solid crude product which, after repeated recrystallization from acetonitrile, yields 2.5 g. of 1-{2-[(carbamoylmethyl)methylamino]ethyl} - 1,3 - dihydro-7 - nitro - 5 - phenyl-2H-1,4-benzodiazepin-2-one of melting point 215°–218° (decomposition). Chromatography of the different mother liquors and recrystallization of the uniform fractions yields, besides unreacted starting material, an additional amount of the desired product of melting point 215°–218° (decomposition).

Example 5

In accordance with the procedure described in Example 1, from 11.1 g. of 5-(o-fluorophenyl)-1,3-dihydro-7-nitro-2H-1,4-benzodiazepin-2-one and 8.4 g. of 2-(N-methyl-2-chloroethylamino)acetamide hydrochloride there is obtained an oily crude product which is directly chromatographed on 500 g. of silica gel using methylene chloride/ethyl acetate (1:1) as the eluting agent. The uniform fractions give unreacted starting material. By washing out the column with methanol, evaporation of the eluate and recrystallization of the residue from ethanol there is obtained 1 - {2 - [(carbamoylmethyl)methylamino]ethyl}-5 - (o - fluorophenyl)-1,3-dihydro-7-nitro-2H-1,4-benzodiazepin-2-one of melting point 187°–189°.

Example 6

In accordance with the procedure described in Example 1, from 11.7 g. of 7-bromo-1,3-dihydro-5-(2-pyridyl)-2H-1,4-benzodiazepin-2-one and 8.4 g. of 2-(N-methyl-2-chloroethylamino)acetamide hydrochloride there is obtained a solid crude product which, after recrystallization from ethanol, yields 7-bromo-1-{2-[(carbamoylmethyl)methylamino] - ethyl} - 1,3 - dihydro-5-(2-pyridyl)-2H-1,4-benzodiazepin-2-one of melting point 176°–178°. Chromatography of the different mother liquors and recrystallization of the uniform fractions gives, besides unreacted starting material, an additional amount of the desired product of melting point 176°–178°.

Example 7

In an analogous manner to that described in Example 1, from 10 g. of 7-chloro-1,3-dihydro-5-phenyl-2H-1,4-benzodiazepin-2-one and 9.45 g. of 2-(N-ethyl-2-chloroethylamino)acetamide hydrochloride (which can be obtained in analogy to the known preparation of the corresponding N-methyl derivative and which melts at 130°–131°) there is obtained a solid crude product which after recrystallization from acetonitrile, yields 6.6 g. of 1-{2-[(carbamoylmethyl)ethylamino]ethyl} - 7-chloro-1,3-dihydro-5-phenyl-2H-1,4-benzodiazepin-2-one of melting point 116°–118°.

Example 8

In an analogous manner to that described in Example 1, from 10 g. of 7-chloro-1,3-dihydro-5-phenyl-2H-1,4-benzodiazepin-2-one and 8.15 g. of 2-(N-methyl-2-chloroethylamino)propionitrile hydrochloride there is obtained an oily crude product which is directly chromatographed on 500 g. of silica gel using methylene chloride/ethyl acetate (1:1) as the eluting agent. The uniform fractions crystallize from ether and yield 1-{2-[(cyanoethyl)methylamino]ethyl} - 7 - chloro - 1,3 - dihydro-5-phenyl-2H-1,4-benzodiazepin-2-one of melting point 82°–83°. By treatment, in the usual manner, with methanolic hydrochloric acid there can be obtained a dihydrochloride which can be readily crystallized from ethanol/ether and which melts at above 200° with decomposition.

Example 9

5.0 g. of 1 - {2 - [(cyanoethyl)methylamino]ethyl}-7-chloro - 1,3 - dihydro-5-phenyl-2H-1,4-benzodiazepin-2-one are shaken with 100 ml. of a solution of 33% hydrobromic acid in glacial acetic acid for 4 hours at room temperature. The clear solution obtained is poured onto 600 ml. of ether and allowed to stand in an ice bath for 0.5 hour. The hydrobromide which precipitates is separated off, rapidly washed with ether and immediately dissolved in ice water. With the addition of ice, the aqueous solution is made alkaline with 2 N caustic soda and extracted with methylene chloride. The extracts are dried over sodium sulfate and evaporated, and the residue is crystallized from hexane/ether, whereby there is obtained 1-{2-[(carbamoylethyl)methylamino]ethyl} - 7 - chloro - 1,3-dihydro - 5 - phenyl-2H-1,4-benzodiazepin-2-one of melting point 140°–143°. One recrystallization from ethanol increases the melting point to 143°–145°.

Example 10

8.2 g. (0.02 M) of 7-chloro-1,3-dihydro-1-[2-(methylamino)ethyl]-5-phenyl-2H-1,4-benzodiazepin - 2 - one dihydrochloride are dissolved in 50 ml. of ice water, treated with 20 ml. of 2 N caustic soda and extracted four times with 50 ml. of methylene chloride each time. The organic phase is dried over sodium sulfate, evaporated and the residual oily base taken up in 20 ml. of methylene chloride. This solution is then added to a mixture of 30 ml. of methyl ethyl ketone, 1.5 g. (0.02 M) of chloroacetonitrile, 3.1 g. (0.02 M) of sodium iodide and 2.8 g. (0.022 M) of N-ethyldiisopropylamine and boiled at reflux for 6 hours. After concentration under reduced pressure, the residue is partitioned between water and methylene chloride, the organic phase washed with a saturated aqueous solution of sodium chloride, dried over sodium sulfate and concentrated to dryness. The residual oil is chromatographed on 200 g. of silica gel using ethyl acetate as the eluting agent. The uniform fractions are combined, evaporated and crystallized from ether. 7-chloro-1-{2-[(cyanomethyl)methylamino]ethyl}-1,3-dihydro - 5 - phenyl-2H-1,4-benzodiazepin-2-one of melting point 108°–110° is obtained. Recrystallization from methylene chloride/ether does not increase the melting point.

The starting material can be prepared as follows:

A solution of 20 g. (0.074 M) of 7-chloro-1,3-dihydro-5-phenyl-2H-1,4-benzodiazepin-2-one in 200 ml. of dimethylformamide is treated at 0°–5° with a solution of 4.12 g. (0.18 M) of sodium in 40 ml. of methanol. The mixture is subsequently stirred for 15 minutes at room temperature, 3.0 g. of sodium iodide and 20 g. (0.090 M) of N - (2-chloro-ethyl)-N-methylbenzylamine hydrochloride are added and the resulting mixture is heated at 60° for 6 hours. After concentration under reduced pressure, the oily residue is partitioned between water and methylene chloride, the organic phase is washed with a saturated aqueous sodium chloride solution, dried over sodium sulfate and concentrated to dryness. The residual oil is dissolved in 100 ml. of benzene and treated dropwise at 20°–25° with 30.9 g. (0.2 M) of chloroformic acid benzyl ester. It is subsequently boiled at reflux for 3 hours. After evaporation, the oily residue is taken up in 500 ml. of ether, decanted off from the precipitate and treated with 100 ml. of 1 N methanolic hydrochloric acid. The precipitated hydrochloride is filtered off by suction, washed with ether and briefly boiled up in 200 ml. of acetone. There is obtained 1-{2-[(benzyloxycarbonyl)methylamino]ethyl}-7-chloro-1,3-dihydro - 5 - phenyl-2H-1,4-benzodiazepin-2-one hydrochloride which can be employed for the next step without further purification. An analytically pure product melting at 176°–180° with decomposition is obtained by crystallization from acetone.

26.6 g. of 1 - {2 - [(benzyloxycarbonyl)methylamino]ethyl}-7-chloro-1,3-dihydro - 5 - phenyl-2H-1,4-benzodiazepin-2-one hydrochloride are dissolved in 75 ml. of glacial acetic acid, 150 ml. of a solution of 33% hydrobromic acid in glacial acetic acid are added, the mixture is allowed to stand at room temperature with occasional thorough shaking for 3 hours and poured onto 1000 ml. of ether. The precipitate is decanted off and immediately partitioned between 1000 ml. of ice water and 1000 ml. of methylene chloride. With the addition of ice, it is made alkaline with 2 N caustic soda, the organic phase is separated off and the aqueous phase is extracted with methylene chloride. The extracts are dried over sodium sulfate, evaporated, the oily residue is dissolved in ca. 30 ml. of methanol and treated with an excess of 2 N methanolic hydrochloric acid. The salt which precipitates in crystalline form is filtered off and washed with ether. There is obtained 7-chloro-1,3-dihydro-1-[2-(methylamino)ethyl]-5-phenyl-2H-1,4-benzodiazepin-2-one dihydrochloride of melting point 220°–223° (decomposition). Crystallization from methanol/ether does not increase the melting point.

Example 11

0.9 g. of 1 - {2-[(cyanomethyl)methylamino]ethyl}-7-chloro-1,3-dihydro-5-phenyl - 2H - 1,4 - benzodiazepin-2-one are shaken with 25 ml. of a solution of 33% hydrobromic acid in glacial acetic acid for 7 hours, there being obtained a clear solution. The working up is effected in the manner described in Example 9. There is obtained a crude product of melting point 143°–146°. Recrystallization from acetone gives 1-{2-[(carbamoylmethyl)methylamino]ethyl}-7-chloro-1,3-dihydro - 5 - phenyl - 2H - 1,4-benzodiazepin-2-one of melting point 146°–148°.

Example 12

A solution of 10 g. (0.029 M) of 7-chloro-1-(3-chloropropyl)-1,3-dihydro - 5 - phenyl-2H-1,4-benzodiazepin-2-one in 50 ml. of methyl ethyl ketone is treated with 4.4 g. of sodium iodide and 5.3 g. (0.058 M) of 2-methylaminoacetamide and boiled at reflux for 20 hours. After concentration under reduced pressure, the residue is partitioned between water and methylene chloride, the organic phase washed with a saturated aqueous sodium solution, dried over sodium sulfate and concentrated to dryness. The residual oil is chromatographed on 300 g. of silica gel, first using ethyl acetate and subsequently using ethyl acetate/methanol (1:1) as the eluting agent. The first fraction eluted with ethyl acetate give some unreacted starting material. The subsequent fractions eluted with ethyl acetate/methanol (1:1) yield, after evaporation, an oil which is crystallized from ether and, after recrystalization from methylene chloride/ether, yields 1-{3-[(carbamoylmethyl)methylamino]propyl}-7-chloro - 1,3 - dihydro-5-phenyl-2H-1,4-benzodiazepin - 2 - one of melting point 136°–138°.

Example 13

In an analogous manner to that described in Example 1, from 10.6 g. of 7-chloro-1,3-dihydro-5-phenyl - 2H - 1,4-benzodiazepin-2-one 4-oxide and 8.4 g. of 2-(N-methyl-2-chloroethylamino)acetamide hydrochloride there is obtained a solid crude product which, for purification, is first shaken with a solution of 10 g. of succinic acid in 200 ml. of water for 0.5 hour. Unreacted starting material is recovered by filtering off under suction. The filtrate is adjusted to pH 7–8 with 2 N ammonium hydroxide and shaken out with methylene chloride. The extracts are dried over sodium sulfate, evaporated and the residue is crystallized from ether. Two recrystallizations from acetonitrile yield 1-{2-[(carbamoylmethyl)methylamino]ethyl}-7-chloro-1,3-dihydro - 5 - phenyl-2H-1,4-benzodiazepin-2-one 4-oxide of melting point 162°–164° (decomposition).

Example 14

A solution of 2 g. of 1-{2-[(carbamoylmethyl)methylamino]ethyl}-7-chloro-1,3-dihydro - 5 - phenyl - 2H - 1,4-benzodiazepin-2-one 4-oxide in 15 ml. of chloroform is treated with 1 ml. of phosphorus trichloride and boiled at reflux for 5 hours. The mixture is thereupon poured onto ice, shaken with an excess of 40% caustic soda, the organic phase is separated off, dried over sodium sulfate and evaporated. The residual oil is taken up in ethyl acetate and chromatographed on 60 g. of silica gel, initially using ethyl acetate and subsequently using ethyl acetate/methanol (1:1) as the eluting agent. The uniform fractions eluted with ethyl acetate/methanol are evaporated and the residual oil is crystallized from ether. Recrystallization from acetone yields 1-{2-[(carbamoylmethyl)methylamino]ethyl}-7-chloro-1,3-dihydro-5-phenyl - 2H - 1,4-benzodiazepin-2-one of melting point 146°–148°.

Example 15

A solution of 10 g. (0.037 M) of 7-chloro-1,3-dihydro-5-phenyl-2H-1,4-benzodiazepin-2-one in 70 ml. of dimethylformamide is treated at 0°–5° with a solution of 1.03 g. (0.045 M) of sodium in 10 ml. of methanol. The mixture is subsequently stirred at room temperature for 30 minutes and, after the addition of 6.3 g. (0.053 M) of 2-chloroethoxyacetonitrile, heated at 60° for 6 hours. After concentration under reduced pressure, the residue is partitioned between water and methylene chloride, the organic phase washed with a saturated aqueous sodium chloride solution, dried over sodium sulfate and evaporated. The oil remaining behind is chromatographed over 150 g. of aluminum oxide (neutral, activity III) with benzene. The homogeneous fractions are combined, concentrated, taken up in about 30 ml. of methanol and treated with excess 2 N methanolic hydrochloric acid. The salt which precipitates in crystalline form after the addition of ether is filtered off, washed with ether and recrystallized from methanol/ether. There are obtained 5.4 g. of 1-[2-(cyanomethoxy)ethyl]-7-chloro-1,3-dihydro-5-phenyl-2H-1,4-benzodiazepin-2-one hydrochloride which melts at above 220° with decomposition.

Example 16

1.5 g. of 1-[2-cyanomethoxy)ethyl]-7-chloro-1,3-dihydro-5-phenyl-2H-1,4 - benzodiazepin-2-one hydrochloride are treated with 15 ml. of a solution of 33% hydrobromic acid in glacial acetic acid and allowed to stand at room temperature for 2 hours. The mixture is worked up according to the procedure described in Example 1 and there is obtained a crude product which is recrystallized from acetonitrile. 1-[2-carbamoylmethoxy)ethyl]-7-chloro-1,3-dihydro-5-phenyl-2H-1,4 - benzothiazepin-2-one of melting point 97°–100° is obtained.

Example 17

In accordance with the procedure described in Example 15, from 11.7 g. of 7-bromo-1,3-dihydro-5-(2-pyridyl)-2H-1,4-benzodiazepin-2-one and 6.3 g. of 2-chloroethoxyacetonitrile there is obtained an oily crude product which is chromatographed on 200 g. of silica gel, first using a mixture of methylene chloride/ethyl acetate (1:1) and subsequently using ethyl acetate. The homogeneous fractions eluted with methylene chloride/ethyl acetate yield an oil which crystallizes from ether. After recrystallization from ethanol, there is obtained 7-bromo-1-[2-(cyanomethoxy)ethyl]-1,3-dihydro-5-(2-pyridyl)-2H-1,4-benzodiazepin-2-one of melting point 126°–128°. The subsequent fractions eluated with ethyl acetate yield unreacted starting material.

Example 18

A solution of 10 g. (0.035 M) of 7-chloro-5-(o-fluorophenyl)-1,3-dihydro-2H-1,4 - benzodiazepin-2-one in 65 ml. of dimethylformamide is cooled to 0°–5° and, with stirring, treated with a solution of 0.95 g. (0.041 M) of sodium in 9.5 ml. of methanol. The mixture is subsequently stirred at room temperature for 30 minutes, then a solution of 11.9 g. (1.0 M) of 2-chloroethoxyacetonitrile in 10 ml. of dimethylformamide is added and the mixture is heated at 60° for 6 hours. It is thereupon evaporated under reduced pressure and the residue partitioned between water and methylene chloride. The organic phase is washed with a saturated aqueous sodium chloride solution, dried over sodium sulfate and concentrated. The residual oily crude product is then directly treated with 50 ml. of a solution of 33% hydrobromic acid in glacial acetic acid and allowed to stand at room temperature for 2 hours. The crude solution is poured onto 200 ml. of ether and left to stand in an ice bath for 0.5 hours. The precipitate is decanted off and immediately partitioned between 200 ml. of ice water and 100 ml. of methylene chloride. With the addition of ice, it is made alkaline with 2 N caustic soda, the organic phase is separated off and the aqueous phase is exhaustively extracted with methylene chloride. The extracts are dried over sodium sulfate, sulfate, evaporated, the residue is taken up in 40 ml. of methylene chloride and chromatographed on 200 g. of silica gel. For the elution, there are successively used 250 ml. of methylene chloride/ethyl acetate (1:1), 1000 ml. of ethyl acetate and 1000 ml. of methanol/acetone (1:1). After crystallization from ether, the first fractions eluted with methylene chloride/ethyl acetate and ethyl acetate give starting material. From the subsequent fractions eluted with methanol/acetone there is obtained, after crystallization from ethanol, 1-[2-carbamoylmethoxy)ethyl]-7-chloro - 5 - (o-fluorophenyl) - 1,3 - dihydro-2H-1,4-benzodiazepin-2-one of melting point 187°–189°.

Example 19

In accordance with the procedure described in Example 18, from 10.6 g. of 7-chloro-5-(o-chlorophenyl)-1,3-dihydro-2H-1,4-benzodiazepin-2-one and 11.9 g. of 2-chloroethoxyacetonitrile there is obtained a crude product which is directly reacted with hydrobromic acid in glacial acetic acid. By working up in an analogous manner to that described in Example 18 there is obtained, besides starting material, 1-[2-carbamoylmethoxy)ethyl]-7-chloro-5-(o-chlorophenyl)-1,3-dihydro - 2H - 1,4-benzodiazepin-2-one of melting point 198°–200°.

Example 20

2.25 g. (0.041 M) of sodium methylate are added with stirring at room temperature to a solution of 10 g. (0.035 M) of 7 - chloro-5-(o-fluorophenyl)-1,3-dihydro-2H-1,4-benzodiazepin-2-one in 70 ml. of dimethylformamide. After the mixture has been stirred for a further 30 minutes, a solution of 7.0 g. (0.051 M) of 2-chloroethoxyacetamide in 5 ml. of dimethylformamide is added and the resulting mixture is heated at 70° for 6 hours. After concentration under reduced pressure, the residue is partitioned between water and methylene chloride, the organic phase is washed with a saturated aqueous sodium chloride solution, dried over sodium sulfate and evaporated. The residual oil is taken up in 40 ml. of methylene chloride and chromatographed on 200 g. of silica gel according to the procedure described in Example 18. Besides unreacted starting material, there is obtained 1-[2-(carbamoylmethoxy)ethyl] - 7 - chloro-5-(o-fluorophenyl)-1,3-dihydro-2H-1,4-benzodiazepin - 2 - one of melting point 187°–189°.

The 2-chloroethoxyacetamide starting material can be prepared as follows:

90 ml. of concentrated sulfuric acid are added at 0°–5° with stirring to 119.5 g. of 2-chloroethoxyacetonitrile. The temperature is then allowed to rise by itself and, by means of occasional cooling, is first held at 5°–10° for 30 minutes and subsequently, until cessation of the exothermic reaction (ca. 2 hours), at 35°–45°. The mixture is thereupon allowed to stand at room temperature overnight and then poured onto 450 g. of ice water. It is shaken at 0° for 2 hours and the clear solution obtained is shaken out six times with 500 ml. of methylene chloride each time. The organic phase is washed with sodium sulfate, concentrated and the crystalline residue triturated with ether and filtered off by suction. There are obtained 115 g. of 2-chloroethoxyacetamide of melting point 75°–77°. An analytically pure product of melting point 76°–77° is obtained by crystallization from methyl chloride/ether.

Example 21

In an analogous manner to that described in Example 20, by reaction of 11.0 g. of 7-bromo-1,3-dihydro-5-(2-pyridyl) - 2H-1,4-benzodiazepin-2-one with 7.0 g. of 2-chloroethoxyacetamide there is obtained, besides starting material, 7 - bromo-[2-(carbamoylmethoxy)ethyl]-1,3-dihydro - 5-(2-pyridyl)-2H-1,4-benzodiazepin-2-one which melts at 143°–144° after recrystallization from ethanol.

Example 22

In an analogous manner to that described in Example 15, from 10 g. of 7-chloro-1,3-dihydro-5-phenyl-2H-1,4-benzodiazepin-2-one and 8.1 g. of 2-chloroethoxyacetic acid methyl ester there is obtained an oily crude product which is purified by chromatography on 150 g. of aluminum oxide (neutral, activity III) using benzene as the eluting agent. Conversion into the hydrochloride in a conventional manner yields 1.5 g. of 7-chloro-1,3-dihydro-1-{2 - [(methoxycarbonyl)methoxy]ethyl} - 5-phenyl-2H-1,4 - benzodiazepin-2-one hydrochloride which melts at 179°–182° with decomposition after repeated recrystallization from methanol/ether.

Example 23

10 g. (0.026 M) of 7-chloro-1-(3-chloropropyl)-1,3-dihydro-5-phenyl-2H-1,4-benzodiazepin-2-one, 3.8 g. (0.03 M) of N-ethyldiisopropylamine, 5.3 g. (0.058 M) of 2-mercaptoacetamide (freshly prepared) and 4.4 g. of sodium iodide are dissolved in 50 ml. of methyl ethyl ketone and heated to reflux for 17 hours. The working up is effected in an analogous manner to that described in Example 12. There is obtained an oily crude product which is chromatographed on 200 g. of silica gel using ethyl acetate as the eluting agent. The homogeneous fractions yield an oil which crystallizes from ether. After recrystallization from ethanol, there is obtained 1-{3-[(carbamoyl)methylthio]propyl} - 7-chloro-1,3-dihydro-5 - phenyl-2H-1,4-benzodiazepin-2-one of melting point 135°–137°.

Example 24

2.3 g. (0.042 M) of sodium methylate are added with stirring at room temperature to a solution of 10 g. (0.037 M) of 7 - chloro - 1,3-dihydro-5-phenyl-2H-1,4-benzodiazepin-2-one in 70 ml. of dimethylformamide. The resulting mixture is stirred for a further 30 minutes, then treated with a solution of 8.05 g. (0.053 M) of 2-chloroethoxy-N-methylacetamide in 5 ml. of dimethylformamide, heated at 60° for 6 hours, and concentrated under reduced pressure. The residue is partitioned between water and methylene chloride and the organic phase is washed with a saturated aqueous solution of sodium chloride, dried over sodium sulfate and evaporated. The residual oil is chromatographed on 250 g. of silica gel, initially with ethyl acetate and subsequently with a 1:1 mixture of ethyl acetate and acetone. The fractions eluted with ethyl acetate chiefly contain unreacted starting material. The subsequent homogeneous fractions eluted with ethyl acetate/acetone give an oil which crystallizes from ether. Recrystallization from methylene chloride/ether yields 1-[2-(N-methyl-carbamoylmethoxy)ethyl] - 7 - chloro-1,3-dihydro-5-phenyl-2H-1,4-benzodiazepin-2-one of melting point 140°–142°.

The 2-chloroethoxy-N-methyl-acetamide starting material can be prepared as follows:

A solution of 27.6 g. (0.2 M) of 2-chloroethoxy-acetic acid and 20.4 g. (0.2 M) of triethylamine in 500 ml. of tetrahydrofuran is cooled to —5° and, with stirring, treated with a solution of 23.8 g. (0.22 M) of ethyl chloroformate in 40 ml. of tetrahydrofuran. After 5 minutes, 42 ml. of a 30% aqueous methylamine solution are added dropwise and the resulting mixture is further stirred at room temperature for 1 hour. The tetrahydrofuran is then removed in vacuo and the residue taken up in benzene. The benzene solution is dried over sodium sulfate and evaporated. The residual crude product is fractionated in vacuo to yield 2-chloroethoxy-N-methylacetamide of boiling point 102°–104°/0.4 mm. Hg.

Example 25

By reaction of 10 g. of 7-chloro-1,3-dihydro-5-phenyl-2H-1,4-benzodiazepin-2-one with 8.8 g. of 2-chloroethoxy-N,N-dimethylacetamide in accordance with the procedure described in the first paragraph of Example 24 there is obtained 1 - [2-(N,N-dimethylcarbamoyl-methoxy-ethyl]-7-chloro - 1,3-dihydro-5-phenyl-2H-1,4-benzodiazepin-2-one which melts at 120°–122° after recrystallization from methyl chloride/ether.

The 2 - chloroethoxy-N,N-dimethylacetamide starting material can be prepared by analogy with the procedure described in the final paragraph of Example 24 from 27.6 g. of 2-chloroethoxyacetic acid, 20.4 g. of triethylamine, 23.8 g. of ethyl chloroformate and 40 ml. of a 45% aqueous dimethylamine solution. After distillation in vacuo there is obtained 2-chloroethoxy-N,N-dimethylacetamide having a boiling point of 96°–98°/0.5 mm. Hg.

Example 26

By reaction of 11.3 g. of 7-chloro-5-(o-chlorophenyl)-1,3-dihydro-2H-1,4-benzodiazepin-2-one with 8.8 g. of 2-chloroethoxy-N-ethyl-acetamide in accordance with the procedure described in the first paragraph of Example 24 there is obtained 1-[2-(N-ethyl-carbamoyl-methoxy)-ethyl] - 7 - chloro - 5 - (o-chlorophenyl)-1,3-dihydro-2H-1,4-benzodiazepin-2-one which melts at 136°–138° after recrystallization from methylene chloride/ether.

The 2-chloroethoxy-N-ethylacetamide starting material can be prepared by analogy with the procedure described in the final paragraph of Example 24 from 27.6 g. of 2-chloroethoxy-acetic acid, 20.4 g. of triethylamine, 23.8 g. of ethyl chloroformate and 26 ml. of a 70% aqueous ethylamine solution. After distillation in vacuo there is obtained 2-chloroethoxy-N-ethylacetamide of boiling point 95°–97°/0.2 mm. Hg.

Example 27

A solution of 12.6 g. (0.04 M) of 7-chloro-1,3-dihydro-1-(2 - hydroxyethyl) - 5 - phenyl-2H-1,4-benzodiazepin-2-one in 100 ml. of tetrahydrofuran is treated at room temperature with 2.4 g. (0.05 M) of a 50% sodium hydride dispersion in oil. The resulting mixture is subsequently stirred for 1 hour, cooled to 5°–10° and treated over the course of about 1 hour with a solution of 8.3 g. (0.05 M) of ethyl bromoacetate in 20 ml. of tetrahydrofuran. The resulting yellowish suspension is stirred at room temperature for a further 20 hours, then concentrated under reduced pressure. The residue is partitioned between water and methylene chloride and the organic phase is washed with a saturated aqueous sodium chloride solution, dried over sodium sulfate and evaporated. The oily residue is chromatographed on 280 g. of silica gel using ethyl acetate as eluant. The uniform fractions are combined and concentrated. The residual oily 1-{2-[(ethoxycarbonyl)-methoxy]ethyl}-7-chloro-1,3-dihydro-5-phenyl - 2H - 1,4-benzodiazepin-2-one can be used for the next step without further purification.

A solution of 10.0 g. (0.025 M) of 1-{2-[(ethoxycarbonyl)methoxy]ethyl} - 7 - chloro-1,3-dihydro-5-phenyl-2H - 1,4 - benzodiazepin-2-one in 75 ml. of methanol is treated with 25 ml. of 1.0 N sodium hydroxide solution, stirred at room temperature for 2.5 hours and carefully acidified with acetic acid. The methanol is removed under reduced pressure and the residue is basified with 2 N ammonium hydroxide, extracted with ether, re-acidified with acetic acid and extracted with methylene chloride. The methylene chloride extract is dried over sodium sulfate and concentrated. The residual viscous oil is dissolved in 35 ml. of acetone and treated with 7 g. of p-toluenesulfonic acid. After the addition of 90 ml. of ether there separates out an oil which soon crystallizes. The salt thus formed is purified by dissolving in acetone/methanol (7:1) and reprecipitating with ether. The resulting crystalline powder of 1-[2-(carboxymethoxy)ethyl]-7-chloro-1,3-dihydro-5-phenyl-2H-1,4-benzodiazepin-2-one p-toluenesulfonate melts at 179°–181° (with decomposition).

A solution of 5.45 g. (0.01 M) of 1-[2-(carboxymethoxy)ethyl] - 7 - chloro - 1,3 - dihydro-5-phenyl-2H-1,4-benzodiazepin-2-one p-toluenesulfonate and 2.05 g. (0.02 M) of triethylamine in 25 ml. of tetrahydrofuran is cooled to —5° and, with stirring, treated with a solution of 1.2 g. (0.01 M) of ethyl chloroformate in 3 ml. of tetrahydrofuran. After 5 minutes, 2 ml. of a 30% aqueous methylamine solution are added dropwise and the mixture is subsequently stirred at room temperature for a further 1 hour. The turbid solution is then concentrated to dryness under reduced pressure and the residual oil partitioned between methylene chloride and water. The organic phase is washed with a saturated aqueous solution of sodium chloride, dried over sodium sulfate and evaporated. The residue crystallizes after the addition of ether, and is recrystallized from methylene chloride/ether to yield 1 - [2 - (N-methyl-carbamoyl-methoxy)ethyl]-7-chloro - 1,3 - dihydro - 5 - phenyl-2H-1,4-benzodiazepin-2-one of melting point 140°–142°.

Example 28

A solution of 4.4 g. (0.01 M) of 1-{2-[(ethoxycarbonyl)methoxy]ethyl} - 7 - chloro-1,3-dihydro-5-phenyl-2H-1,4-benzodiazepin-2-one in 20 ml. of methanol is treated with 4.2 ml. of a 30% aqueous methylamine solution, allowed to stand at room temperature for 3 days, and concentrated. The residual oil is taken up in methylene chloride and the resulting solution is washed with water, dried over sodium sulfate and evaporated to dryness. The oily residue is chromatographed on silica gel, initially with ethyl acetate and subsequently with a 1:1 mixture of ethyl acetate and acetone. The uniform fractions eluted with ethyl acetate/acetone yield an oil which crystallizes from ether. Recrystallization from methylene chloride/ether gives 1-[2-(N-methylcarbamoyl-methoxy)-ethyl] - 7 - chloro-1,3-dihydro-5-phenyl-2H-1,4-benzodiazepin-2-one of melting point 140°–142°.

Example 29

In a manner analogous to that described in the first paragraph of Example 10, from 8.2 g. (0.02 M) of 7 - chloro-1,3-dihydro-1-(2-methylamino-ethyl)-5-phenyl-2H-1,4-benzodiazepin-2-one dihydrochloride, 3.0 g. (0.02 M) of N-methyl-bromoacetamide, 3.1 g. (0.02 M) of sodium iodide and 2.8 g. (0.022 M) of N-ethyldiisopropyl-amine there is obtained an oily crude product which is chromatographed on 200 g. of silica gel with ethyl acetate/ethanol (9:1). Evaporation of the uniform fractions yields an oil which is crystallized from ether and recrystallized from acetonitrile/ether to give 1-{2-[(N-methyl - carbamoylmethyl)methylamino]ethyl} - 7 - chloro - 1,3 - dihydro-5-phenyl-2H-1,4-benzodiazepin-2-one of melting point 111–113°.

Example 30

A suspension of 1.95 g. (0.005 M) of 1-[2-(carbamoyl-methoxy)ethyl] - 7 - chloro-5-(o-fluorophenyl)-1,3-dihydro-2H-1,4-benzodiazepin-2-one in 5 ml. of pyridine is treated with 1.05 g. (0.006 M) of benzenesulfonyl chloride and heated at 100° for 30 minutes, a clear solution being formed. The residue obtained after concentrating under reduced pressure is partitioned between water and methylene chloride and the organic phase is washed with a saturated aqueous solution of sodium chloride, dried over sodium sulfate and evaporated. The residual oil is chromatographed on 60 g. of silica gel with ethyl acetate as eluant. The uniform fractions are evaporated and the residual oil is crystallized from ether to yield 1-[2-(cyano-methoxy)ethyl] - 7 - chloro-5-(o-fluorophenyl)-1,3-dihydro-2H-1,4-benzodiazepin-2-one of melting point 100°–101°. Recrystallization from ether/heptane does not increase the melting point.

Example 31

A solution of 19.3 g. (0.05 M) of 2-tosylamino-5-chlorobenzophenone in 190 ml. of toluene is treated with a solution of 1.38 g. (0.06 M) of sodium in 140 ml. of methanol, heated at reflux for 90 minutes and evaporated. The solid residue is dissolved in 130 ml. of dimethylformamide, treated with a solution of 12.4 g. (0.075 M) of 2-chloroethoxy-N,N-dimethylacetamide (obtainable by the procedure of the final paragraph of Example 25), heated at 120° for 48 hours, and concentrated under reduced pressure. The residual oil is partitioned between methylene chloride and water. The organic phase is washed with a saturated aqueous solution of sodium chloride, dried over sodium sulfate and concentrated to dryness. The oily residue is chromatographed on 300 g. of silica gel with ethyl acetate as eluant to yield pure 2-{[2-(N,N-dimethyl-carbamoylmethoxy)ethyl]tosylamino} - 5 - chloro-benzophenone as a viscous oil.

15 g. of 2-{[2-(N,N - dimethyl - carbamoyl - methoxy) ethyl]tosylamino}-5-chloro-benzophenone and 7.5 g. of phenol are dissolved in 75 ml. of a solution of 33% hydrobromic acid in glacial acetic acid and the solution is allowed to stand at room temperature for 2 hours with occasional thorough stirring, then is poured onto 450 ml. of ether. The gummy precipitate is separated off by decantation and immediately partitioned between ice water and methylene chloride. With the addition of ice, the mixture is made alkaline with 2 N sodium carbonate solution, then the organic phase is separated off and the aqueous phase is repeatedly extracted with methylene chloride. The extracts are dried over sodium sulfate and evaporated. The oily residue is purified by chromatography on 300 g. of silica gel with heptane/chloroform/ethanol (10:10:1) to yield 2-[2-(N,N-dimethyl-carbamoyl-methoxy)-ethyl-amino]-5-chloro-benzophenone in the form of a yellow viscous oil with the correct NMR spectrum.

A solution of 7.2 g. (0.02 M) of 2-[2-(N,N-dimethyl-carbamoyl - methoxy) - ethylamino] - 5 - chloro - benzophenone in 20 ml. of chloroform is treated at room temperature with 3.0 g. (0.025 M) of azidoacetyl chloride, stirred at room temperature for 2 hours, diluted with 200 ml. of methylene chloride, washed with 2 N sodium carbonate solution and water, dried over sodium sulfate and concentrated. The residual yellow oil is dissolved in 12 ml. of acetone and treated dropwise at room temperature with 28 ml. of a solution of 33% hydrogen bbromide in glacial acetic acid. The resulting mixture is stirred at room temperature for a further 1 hour, then is poured onto 300 ml. of ether. The precipitate is separated off by decantation and immediately partitioned between ice water and methylene chloride. The mixture is made alkaline with 2 N sodium carbonate, then the organic phase is separated off and the aqueous phase is repeatedly extracted with methylene chloride. After drying over sodium sulfate, the combined extracts are concentrated and the oily residue is chromatographed on 250 g. of silica gel with ethyl acetate/ethanol (9:1). The homogeneous fractions give an oil which crystallizes from ether to yield 1-[2-(N,N-dimethyl-carbamoylmethoxy)-ethyl]-7-chloro - 1,3 - dihydro-5-phenyl-2H-1,4-benzodiazepin-2-one of melting point 120°–121°. Recrystallization from methylene chloride/ether does not increase the melting point.

Example 32

In accordance with the procedure described in the first paragraph of Example 24, by reaction of 10 g. of 7-chloro-1,3-dihydro-5-phenyl - 2H - 1,4-benzodiazepin-2-one with 12.7 g. of methyl 2-(N-benzyl-2-chloroethylamino)-acetate there is obtained 1-{2-[N-benzyl-N-(methoxycarbonylmethyl)amino]ethyl}-7-chloro - 1,3 - dihydro-5-phenyl-2H-1,4-benzodiazepin-2-one which melts at 145°–147° after recrystallization from methanol.

12 g. of 1-{2-[N-benzyl-N-(methoxycarbonylmethyl) amino]-ethyl}-7-chloro-1,3-dihydro - 5 - phenyl - 2H-1,4-benzodiazepin-2-one in 50 ml. of toluene are treated with 7.5 g. of benzyl chloroformate, heated at reflux for 20 hours and evaporated. The oily residue is dissolved in 25 ml. of glacial acetic acid. 75 ml. of a solution of 33% hydrobromic acid in glacial acetic acid are added and the mixture is allowed to stand at room temperature for 2 hours with occasional thorough shaking, then is poured onto 600 ml. of ether. The precipitate is filtered off and immediately partitioned between ice water and methylene chloride. With addition of ice, the mixture is made alkaline with 2 N sodium carbonate, then the organic phase is separated off and the aqueous phase is repeatedly extracted with methylene chloride. The extracts are combined, dried over sodium sulfate and chromatographed on 400 g. of silica gel, initially with ethyl acetate and subsequently with ethyl acetate/acetone (1:1). The fractions eluted with ethyl acetate chiefly contain unreacted starting material. The homogeneous fractions subsequently eluted with ethyl acetate/acetone give an oil which is taken up in 30 ml. of acetone. The resulting solution is treated wtih 1.5 g. of p-toluenesulfonic acid and subsequently gradually with 60 ml. of ether; crystallization occurs. 1 - {2-[(methoxycarbonyl-methyl)-amino]-ethyl}-7-chloro-1,3-dihydro - 5 - phenyl - 2H - 1,4 - benzodiazepin-2-one p-toluenesulfonate of melting point 147°–150°

(with decomposition) is obtained; recrystallization from acetone/ether does not increase the melting point.

The methyl 2-(N-benzyl-2-chloroethylamino)-acetate starting material can be prepared as follows:

A stirred suspension of 20.6 g. (0.1 M) of N-(2-chloroethyl)-benzylamine hydrochloride in 200 ml. of glacial acetic acid is treated at 5°–10° with 9 g. (0.3 M) of paraformaldehyde and 19.5 g. (0.3 M) of potassium cyanide. The resulting mixture is heated to 50° over the course of 30 minutes and maintained at this temperature for 5 hours. After cautious removal of hydrocyanic acid and of acetic acid, the oily residue is triturated with 500 ml. of ice water, adjusted to pH 7 with 2 N ammonia solution and extracted with methylene chloride. The extract is dried over sodium sulfate and concentrated to dryness. The residual oil is dissolved in 100 ml. of methanol and 40 ml. of concentrated hydrochloric acid, and the solution is saturated with hydrogen chloride at 0°–10°, heated to boiling for 15 minutes, and heated to reflux for 4 hours while introducing further hydrogen chloride. After distilling off the methanol, the resulting aqueous suspension is neutralized, while cooling, with sodium bicarbonate and extracted with ether. The extract is dried over sodium sulfate and concentrated. The residual crude product is fractionated in vacuo to give methyl 2-(N-benzyl-2-chloroethylamino) - acetate of boiling point 130°–132°/0.5 mm. Hg.

Example 33

A solution of 1.56 g. (0.004 M) of 1-[2-(carbamoylmethoxy)-ethyl] - 7 - chloro - 5 - (o-fluorophenyl)-1,3,4,5-tetrahydro - 2H - 1,4 - benzodiazepin-2-one in 20 ml. of chloroform is treated dropwise at −10° with 16 ml. (0.5 M) of bromine in chloroform, stirred at 0°–5° for 30 minutes, treated with 20 ml. of 2 N sodium hydroxide solution, and stirred for a further 15 minutes at the same temperature. The organic phase is then separated off, washed with a saturated solution of sodium chloride, dried over sodium sulfate and evaporated to dryness. The semisolid residue is chromatographed on 80 g. of silica gel with acetone/ethyl acetate (1:1) as eluting agent to yield 1 - [2 - (carbamoylmethoxy)-ethyl]-7-chloro-5-(o-fluorophenyl) - 1,3 - dihydro-2H-1,4-benzodiazepin-2-one of melting point 187°–189°.

The 1 - [2 - (carbamoylmethoxy)-ethyl]-7-chloro-5-(o-fluorophenyl) - 1,3,4,5 - tetrahydro-2H-1,4-benzodiazepin-2-one starting material can be prepared in the following manner:

57 g. (0.2 M) of 7-chloro-5-(o-fluorophenyl)-1,3-dihydro-2H-1,4-benzodiazepin-2-one are dissolved in 400 ml. of glacial acetic acid and, after the addition of 0.75 g. of platinum dioxide, hydrogenated under normal conditions. The hydrogenation comes to a standstill after the uptake of the theoretical amount of hydrogen. The catalyst is filtered off and the filtrate evaporated under reduced pressure. The solid residue is titrturated with methanol and filtered off to yield 7-chloro-5-(o-fluorophenyl)-1,3,4,5-tetrahydro - 2H - 1,4-benzodiazepin-2-one of melting point 215°.

A suspension of 29 g. (0.1 M) of 7-chloro-5-(o-fluorophenyl) - 1,3,4,5 - tetrahydro-2H-1,4-benzodiazepin-2-one in 200 ml. of dimethylformamide is treated at room temperature with 34 g. (0.2 M) of benzyl chloroformate. The resulting mixture is stirred until a clear solution is obtained, then is treated dropwise with 20 g. (0.2 M) of triethylamine, stirred at room temperature for a further 15 hours and poured onto ice water. The aqueous phase is separated off and further extracted with ether. The combined ether extracts are washed with ice water, dried over magnesium sulfate and evaporated to dryness. The residue is chromatographed on 1000 g. of silica gel with ethyl acetate as eluant. After recrystallization from ethyl acetate/hexane, the uniform fractions yield 25 g. of 4-benzyloxycarbonyl - 7 - chloro - 5 - (o-fluorophenyl)- 1,3,4,5 - tetrahydro - 2H - 1,4 - benzodiazepin-2-one of melting point 169–170°.

14.9 g. (0.035 M) of 4-benzyloxycarbonyl-7-chloro-5-(o-fluorophenyl) - 1,3,4,5 - tetrahydro - 2H - 1,4 - benzodiazepin-2-one are reacted with 7.0 g. of 2-chloroethoxyacetamide in a manner analogous to that described in the first paragraph of Example 20. After chromatography on silica gel with ethyl acetate as eluant, there is obtained, in addition to unreacted starting material, 4-benzyloxycarbonyl - 1 - [2-(carbamoylmethoxy)ethyl]-7-chloro-5-(o-fluorophenyl) - 1,3,4,5 - tetrahydro-2H-1,4-benzodiazepin-2-one in the form of a viscous oil which can be employed for the next step without further purification.

10 g. of crude 4-benzyloxycarbonyl-1-[2-(carbamoylmethoxy)-ethyl] - 7 - chloro - 5 - (o-fluorophenyl)-1,3,4,5-tetrahydro-2H-1,4-benzodiazepin-2-one are dissolved in 100 ml. of methylene chloride, 20 ml. of a solution of 33% hydrobromic acid in glacial acetic acid are added, and the mixture is stirred at room temperature for 2 hours, then poured onto 200 ml. of ice water. The aqueous phase is separated off, made alkaline at 0°–5° with a saturated solution of sodium carbonate, and extracted with methylene chloride. The extract is washed with a saturated aqueous solution of sodium chloride, dried over sodium sulfate and concentrated to dryness. The residue crystallizes on trituration with ether. Recrystallization from ethanol yields 1 - [2 - (carbamoylmethoxy)-ethyl]-7-chloro-5-(o-fluorophenyl) - 1,3,4,5 - tetrahydro - 2H - 1,4 - benzodiazepin-2-one of melting point 168°–170°.

Example 34

Tablets with the following composition are manufactured:

| | Per tablet, mg. |
|---|---|
| 1 - {2 - [(carbamoylmethyl)methylamino]ethyl}-7-chloro - 5 - (o-fluorophenyl)-1,3-dihydro-2H-1,4-benzodiazepin-2-one | 10 |
| Corn starch | 53 |
| Lactose | 150 |
| Gelatin (10% solution) | 6 |

The active substance, the corn starch and the lactose are thickened with a 10% gelatin solution. The paste is comminuted; the granulate is brought into a suitable pan and dried at 43°. The dried granulate is passed through a comminuting machine and mixed in a mixer with the following ingredients:

| | Mg. |
|---|---|
| Talc | 6 |
| Magnesium stearate | 6 |
| Corn starch | 9 | then compressed to tablets of 240 mg.

Example 35

Suppositories are manufactured with the following ingredients:

| | Per 1 g. suppository, mg. |
|---|---|
| 1 - {2 - [(carbamoylmethyl)-methylamino]ethyl}-7-chloro - 5 - (o-fluorophenyl)-1,3-dihydro-2H-1,4-benzodiazepin-2-one | 10 |
| Hydrogenated coconut oil | 975 |
| Carnauba wax | 15 |

The hydrogenated coconut oil and the carnauba wax are melted in a suitable vessel fitted with glass liner and cooled to 45°. The active substance is added with stirring and stirred until complete dispersion is obtained. The mixture is then poured into suppository molds which ensure a suppository weight of 1 g.

Example 36

A parenteral form of presentation is manufacture with the following ingredients (per ml.):

| | | |
|---|---|---|
| 1 - {2 - [(carbamoylmethyl)-methylamino]ethyl}-7-chloro - 5 - (o-fluorophenyl)-1,3-dihydro-2H-1,4-benzodiazepin-2-one | mg | 5 |
| Dimethylacetamide | percent | 10 |
| Propylene glycol | do | 50 |
| Benzyl alcohol | do | 1.5 |
| Ethanol | do | 10 |
| Water for injection, to 1 ml. | | |

The active substance is dissolved in dimethylacetamide and treated with benzyl alcohol, propylene glycol, ethanol and water. The resulting solution is filtered through a candle filter, filled into suitable ampules, sealed and sterilized.

Example 37

Tablets and suppositories and a parenteral form of presentation are manufactured according to the data in Examples 34, 35, and 36, respectively, 1-[2-(carbamoylmethoxy)ethyl]-7-chloro - 5 - (o - fluorophenyl)-1,3-dihydro-2H-1,4-benzodiazepin-2-one or 1-[2-(carbamoylmethoxy)ethyl]-7-chloro-5-(o-chlorophenyl) - 1,3 - dihydro-2H-1,4-benzodiazepin-2-one being used as the active substance.

We claim:

1. A compound selected from the group of compounds of the formula

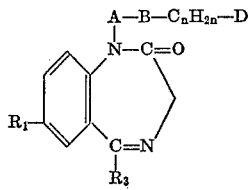

of the formula

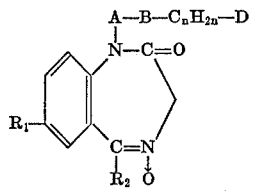

wherein $R_1$ signifies halogen, nitro, trifluoromethyl, alkyl having from 2 to 5 carbon atoms, or lower alkanoyl; $R_2$ signifies pyridyl, phenyl, monohalophenyl or di-halophenyl; A signifies ethylene, propylene or isopropylene; B signifies —O—, —S—, or the group —$NR_3$—wherein $R_3$ is hydrogen or lower alkyl; D signifies lower alkoxycarbonyl, cyano, carbamoyl, mono-lower alkyl-carbamoyl or di-lower alkyl-carbamoyl; $n$ is the integer 1 or 2 and the pharmaceutically acceptable acid addition salts thereof.

2. A compound of claim 1 wherein $R_1$ signifies halogen.

3. A compound of claim 2, wherein said halogen atom is chlorine or iodine, or, when the $R_2$ substituent is a 2-pyridyl group, the halogen atom is bromine.

4. A compound of claim 1 wherein $R_1$ signifies an alkyl group having from 2 to 5 carbon atoms.

5. A compound of claim 4 when said alkyl group is an ethyl group.

6. A compound of claim 1 wherein $R_1$ signifies a lower alkanoyl group.

7. A compound of claim 6 wherein said alkanoyl group is an acetyl group.

8. A compound of claim 1 wherein $R_2$ signifies an orthohalophenyl group.

9. A compound of claim 8 wherein said ortho-halophenyl group is o-fluorophenyl or o-chlorophenyl.

10. A compound of claim 1 wherein D is selected from the group consisting of cyano or carbamoyl.

11. A compound of claim 1 wherein B is selected from the group consisting of —O—, —NH—, or —$NCH_3$—.

12. 1-{2 - [(carbamoylmethyl)methylamino]ethyl}-7-chloro-5-(o-fluorophenyl) - 1,3 - dihydro-2H-1,4-benzodiazepin-2-one.

13. 1-[2-(carbamoylmethoxy)ethyl] - 7 - chloro-5-(o-fluorophenyl)-1,3-dihydro-2H-1,4-benzodiazepin-2-one.

14. 1-[2-(carbamoylmethoxy)ethyl] - 7 - chloro-5-(o-chlorophenyl)-1,3-dihydro - 2H - 1,4 - benzodiazepin-2-one.

15. A compound of the formula

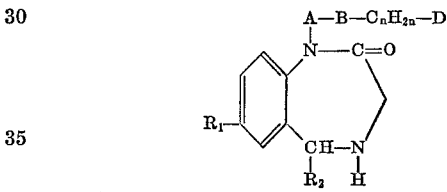

wherein $R_1$ signifies halogen, nitro-trifluoromethyl, alkyl having from 2 to 5 carbon atoms, or lower alykanoyl; $R_2$ signifies pyridyl, phenyl, monohalophenyl or di-halophenyl; A signifies ethylene, propylene or isopropylene; B signifies —O—, —S—, or the group —$NR_3$— wherein $R_3$ is hydrogen or lower alkyl; D signifies lower alkoxycarbonyl, cyano, carbamoyl, mono-lower alkyl-carbamoyl, or di-lower alkyl-carbamoyl; $n$ is the integer 1 or 2.

References Cited

UNITED STATES PATENTS

| | | | |
|---|---|---|---|
| 3,371,085 | 2/1968 | Reeder et al. | 260—239.3 D |
| 3,391,138 | 7/1968 | Archer et al. | 260—239.3 D |

HENRY R. JILES, Primary Examiner

R. T. BOND, Assistant Examiner

U.S. Cl. X.R.

424—244; 260—562 N

UNITED STATES PATENT OFFICE
CERTIFICATE OF CORRECTION

Patent No. 3,757,008                    Dated September 4, 1973

Inventor(s) Joseph Hellerbach and Roland Jaunin

It is certified that error appears in the above-identified patent and that said Letters Patent are hereby corrected as shown below:

Claim 1, column 21, line 38

-should be-

" 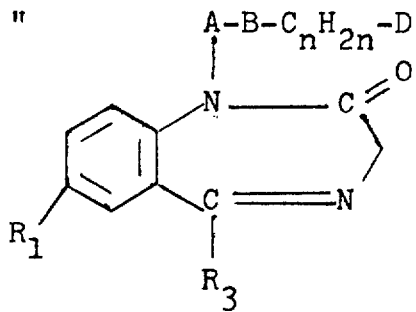 "    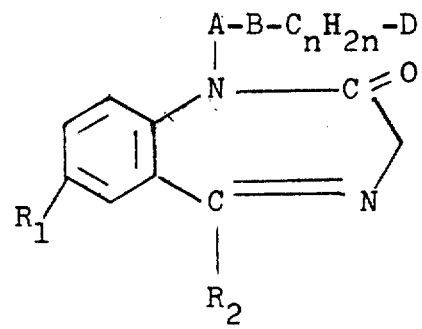

Claim 15, line 39, column 22

"alykanoyl"    -should be-    alkanoyl

Signed and sealed this 5th day of February 1974.

(SEAL)
Attest:

EDWARD M. FLETCHER, JR.          RENE D. TEGTMEYER
Attesting Officer                Acting Commissioner of Patents